United States Patent [19]

Ejima et al.

[11] Patent Number: 5,526,467
[45] Date of Patent: Jun. 11, 1996

[54] MEMBERSHIP FUNCTION DATA PREPARATION METHOD AND AN APPARATUS THEREOF AND AN ADAPTION DEGREE OPERATION METHOD AND AN APPARATUS THEREOF

[75] Inventors: Hideji Ejima; Masatugu Miura, both of Kyoto, Japan

[73] Assignee: Omron Corporation, Kyoto, Japan

[21] Appl. No.: 355,201

[22] Filed: Dec. 8, 1994

Related U.S. Application Data

[63] Continuation of Ser. No. 874,965, Apr. 28, 1992, abandoned.

[30] Foreign Application Priority Data

May 10, 1991  [JP]  Japan ................... 3-133305

[51] Int. Cl.⁶ ................ G06F 9/44; G05T 13/00
[52] U.S. Cl. ............. 395/51; 395/61; 395/900; 395/3
[58] Field of Search ............. 395/51, 61, 3, 395/900

[56] References Cited

U.S. PATENT DOCUMENTS

| | | | |
|---|---|---|---|
| 4,914,924 | 4/1990 | Takahashi | 62/133 |
| 5,084,754 | 1/1992 | Tomitaka | 358/209 |
| 5,142,664 | 8/1992 | Zhang | 395/3 |
| 5,146,898 | 9/1992 | Itakura et al. | 123/492 |
| 5,175,801 | 12/1992 | Iokibe | 395/61 |
| 5,185,849 | 2/1993 | Miyazawa et al. | 395/3 |
| 5,241,651 | 8/1993 | Ueda | 395/61 |
| 5,253,332 | 10/1993 | Kumamoto | 395/51 |
| 5,267,348 | 11/1993 | Someya et al. | 395/61 |

FOREIGN PATENT DOCUMENTS

| | | | |
|---|---|---|---|
| 0424890 | 5/1991 | European Pat. Off. | G05B 19/05 |
| 3936503 | 5/1990 | Germany | G06F 15/353 |

*Primary Examiner*—Robert W. Downs
*Attorney, Agent, or Firm*—Dickstein, Shapiro & Morin

[57] ABSTRACT

There is provided an improved system wherein a storage capacity for storing membership functions is reduced. In the system, a plurality of sections T11 through T16 are set having boundaries at vertexes or tops where the respective grades of a plurality of membership functions MF11 through MF17 become the maxim values. In each section, a pair of adjacent membership functions are set to be in an overlapping relationship and symmetrical with respect to a center of the section about their shapes. Coordinates X11 through X17 of the respective vertexes and gradient data g11 through g16 providing shapes of membership functions in the respective sections are set as the data providing the plurality of membership functions.

7 Claims, 7 Drawing Sheets

MF DATA (INPUT VARIABLE x 1)

| |
|---|
| x11 (PEAK OF MF11) |
| x12 (PEAK OF MF12) |
| x13 (PEAK OF MF13) |
| x14 (PEAK OF MF14) |
| x15 (PEAK OF MF15) |
| x16 (PEAK OF MF16) |
| x17 (PEAK OF MF17) |
| g11 (GRADIENT OF SECTION T11) |
| g12 (GRADIENT OF SECTION T12) |
| g13 (GRADIENT OF SECTION T13) |
| g14 (GRADIENT OF SECTION T14) |
| g15 (GRADIENT OF SECTION T15) |
| g16 (GRADIENT OF SECTION T16) |
| w11 (WEIGHT OF MF11) |
| w12 (WEIGHT OF MF12) |
| w13 (WEIGHT OF MF13) |
| w14 (WEIGHT OF MF14) |
| w15 (WEIGHT OF MF15) |
| w16 (WEIGHT OF MF16) |
| w17 (WEIGHT OF MF17) |

FIG.4

BUFFER MEMORY

| INPUT x 1 · ADAPTATION SECTION |
|---|
| RIGHT LABEL ADAPTATION DEGREE |
| LEFT LABEL ADAPTATION DEGREE |
| INPUT x 2 · ADAPTATION SECTION |
| RIGHT LABEL ADAPTATION DEGREE |
| LEFT LABEL ADAPTATION DEGREE |

MEMBERSHIP FUNCTION DATA PREPARATION METHOD AND AN APPARATUS THEREOF AND AN ADAPTION DEGREE OPERATION METHOD AND AN APPARATUS THEREOF

This application is a continuation of application Ser. No. 07/874,965 filed Apr. 28, 1992, now abandoned.

BACKGROUND OF THE INVENTION

1. Field of the Invention

This invention relates to a membership data preparation method for fuzzy inference operation and an apparatus thereof, and an adaptation degree, operation method and apparatus thereof.

2. Discussion of the Related Art

A fuzzy inference operation is generally executed by a fuzzy rule of an IF-THEN type which consists of an antecedent starting with IF and a consequent starting with THEN. Each of the antecedent and consequent includes one or a plurality of propositions combined by AND or OR, each of the propositions consisting of an input variable and a membership function. A conventional storage of a conventional fuzzy inference operation device stores data representing membership functions in addition to data representing the rules.

There is well known a ROM reading method in which data representing a form of membership function is stored into ROM corresponding to a variable for each membership function. Since a result of antecedent adaptation degree operation is obtained only by reading function value data (degree of adaptation) from ROM, the antecedent adaptation degree operation can be executed at a high speed but a large capacity memory is requested to store all function value data into ROM in advance. Accordingly, the conventional method is not practical except a case where any high resolution of membership function is not necessary.

There is also well known a X/Y coordinate method in which a membership function is expressed by a polygonal line and a X and Y coordinate of a break point (inflection point) is stored into ROM for each membership function. According to the method, a storage capacity for storing X and Y coordinate data can be reduced, but an operation by software for a degree of adaptation takes a long time. If a hardware of an adaptation degree operation circuit is employed for a high speed operation, it is costly.

There is also well known a X/gradient method in which a membership function is expressed by a simple shape, such as a triangle or the like, and a X coordinate and left and right gradients of the vertex (its grade is always "1") of a triangle are stored into ROM for each membership function. The method employs gradient data for a high speed operation, and does not employ division for an adaptation degree operation. This method also cannot remarkably reduce the capacity of ROM. For example, when seven kinds of membership functions are set for each of input variables which are eight kind of variables, a memory having 200 bytes is necessary, and a fuzzy inference operation device is limited for minimizing a cost.

SUMMARY OF THE INVENTION

It is, therefore, a primary object of this invention to provide an improved system of a X/gradient method in which a memory for storing membership function data is minimized.

According to this invention, there is provided a method for preparing membership function data in which a plurality of sections are set having their boundaries at peaks where a plurality of membership functions respectively have the largest values of their grades, in each of the sections a pair of adjacent membership functions are set in an overlapping relationship shapes of which are symmetrical with respect to a center of the section, and data of a coordinate of each peak and data providing a shape of a membership function are set in each section so as to represent a plurality of membership functions.

According to another aspect of this invention there is provided a membership function data preparing device which comprises a first means for setting a plurality of sections having boundaries at peaks where a plurality of membership functions respectively have the largest values of their grades, and a second means for setting in each of the sections data providing a pair of adjacent membership functions which are in an overlapping relationship and their shapes are symmetrical with respect to a center of each section. If shapes of the membership functions are triangles, the data providing the shapes are data representing gradients and are obtained from data of peaks.

In the above-mentioned method and device for membership function data preparation, coordinate data of peaks showing the maximum values of grades in the respective membership functions are entered, and a plurality of sections having boundaries at the peaks are set. In each of the sections, membership functions are set in a manner that a pair of adjacent membership functions are in an overlapping relationship and their shapes are symmetrical with respect to a center of each section. Data of a coordinate of each peak and parameters providing a shape of a membership function in each section are set so as to represent a plurality membership functions.

According to the method and device, there is a portion of a pair of membership functions exists in a section at both ends thereof having boundaries at peaks of membership functions, and the two membership functions in the section are represented by a coordinate of one peak and one shape parameter, so that a storage capacity of a memory is reduced to a half of a capacity necessary in a conventional X/gradient method. In a case where shapes of membership functions are triangles, shape parameters and gradient data are automatically operated when coordinates of peaks of the membership functions are given, so that setting membership functions is simplified and finishes in a short time period.

According to still another aspect of this invention, there is provided a method for operating a degree of adaptation where a plurality of membership functions are set, shapes of a pair of membership functions in one of sections having boundaries at peaks of the functions are symmetrical with respect to a center of the section, and parameters providing a shape of a membership function are set for each section, which comprises the steps of Judging a section belonged by input data when the input data is applied, finding in the judged section a first degree of adaptation of a first membership function one hand by the coordinate of the peak and the parameters, and finding a second degree of adaptation of a second membership function on other hand in view of the first found degree of adaptation.

According to more still another aspect of this invention, there is provided an adaptation degree operation device where a plurality of membership functions are set, shapes of a pair of membership functions in one of sections having boundaries at peaks of the functions are symmetrical with respect to a center of the section, and parameters providing a shape of a membership function are set for each section, which comprises a judge unit for judging a section belonged by input data when the input data is applied, and an operation unit for finding in the judged section a first degree of adaptation of a first membership function on one hand by the coordinate of the peak and the parameters and for finding a second degree of adaptation of a second membership function on the other hand in view of the first found degree of adaptation. The second degree of adaptation is obtained by subtracting the first degree of adaptation form "1". In the device where weight data is applied to each membership function, a weighting operation is executed by applying weighting data of corresponding membership functions to the first and second degrees of adaptation.

In the above mentioned method and device for adaptation degree operation, a degree of adaptation is operated by data representing membership functions produced by the above-mentioned method and device for membership function data preparation, viz., the data of coordinates of peaks and parameters providing shapes. When input data is applied, a section belonged by the input data is Judged. A first degree of adaptation is found by employing the coordinates and parameters about a first membership function of the pair of functions in the judged section, and a second degree of adaptation is found based on the first degree of adaptation about second membership function of the pair of functions.

In the method and device where weight data is applied to each membership function, a weighting operation is executed by applying weighting data of corresponding membership functions to the first and second degrees of adaptation.

According to the method and device, the second degree of adaptation can be obtained by a simplified operation if the first degree of adaptation is found. Since the second degree of adaptation is obtained by subtracting the first degree of adaptation from "1", the second degree is made by reversing the respective bits of data representing the first degree of adaptation, so that an operation time can be reduced to a half of the conventional method.

Since three of more degrees of adaptation does not exist about one input data, two adaptation degrees per one input are enough for its subsequent operations, and a capacity of a buffer storing interim values is minimized with a reduced cost. When each membership function is weighted, it is possible to weight after a result of operations without weighting to reduce a time of operations.

BRIEF DESCRIPTION OF THE DRAWINGS

The above and other objects, advantages and features of this invention will be more fully understood from the following detailed description provided in conjunction with the following figures, of which:

FIG. 4 is a table showing prepared membership function data;

FIG. 7 shows contents of a buffer memory employed in the device of FIG. 5;

DETAILED DESCRIPTION OF THE INVENTION

Figure 1:
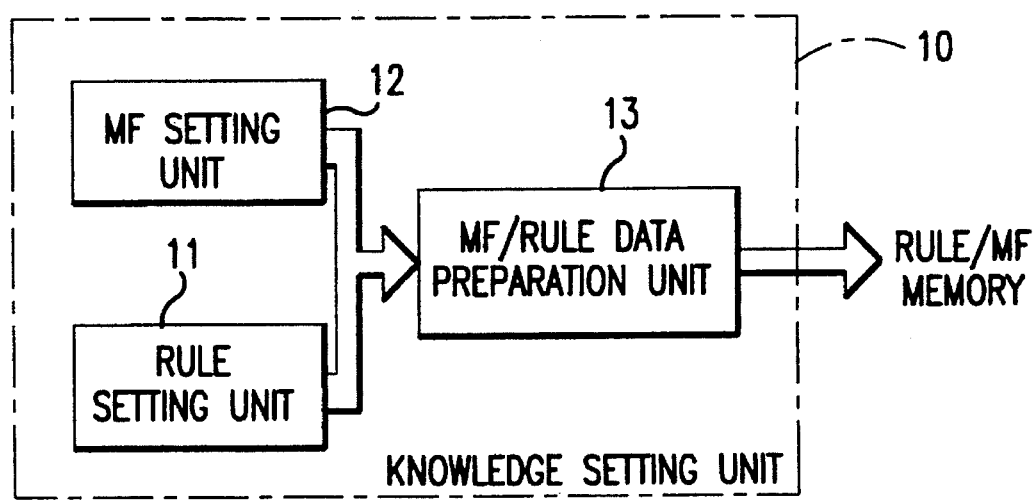
FIG. 1 is a schematic block diagram of a knowledge setting device of a first embodiment of this invention.
Figure 5:
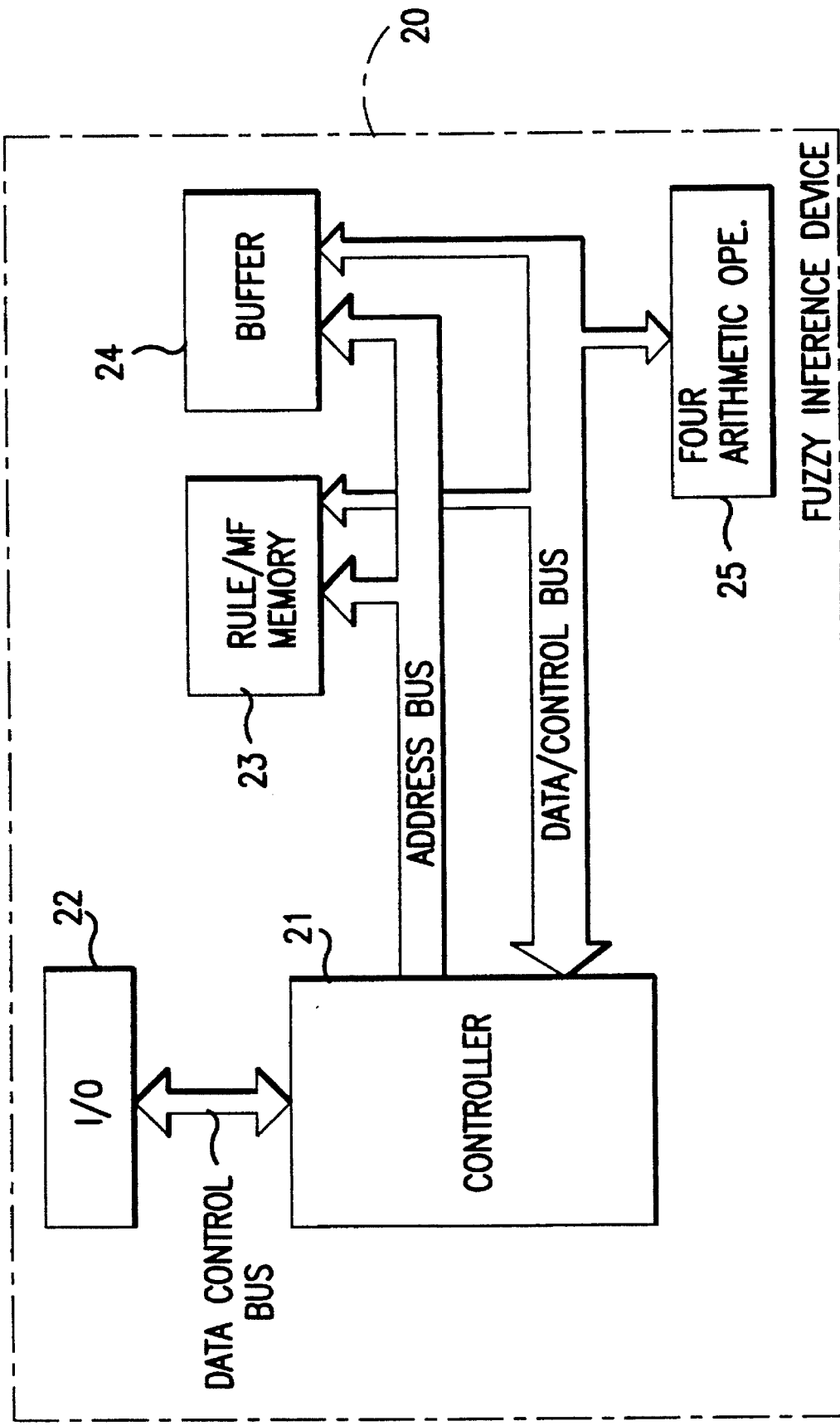
FIG. 5 is a schematic block diagram of a fuzzy inference device.

Referring, now, to FIG. 1, there is shown a schematic block diagram of a knowledge setting device 10 as a preferred embodiment of this invention. The device 10 may be a part of a fuzzy inference device 20 as later shown in FIG. 5 or be independent from the device 20. The device 10 includes a computer having a program, an input device having a keyboard associated with the computer, and a display unit, such as a CRT display or the like, to provide a rule setting unit 11, a membership function (MF) setting unit 12, and a membership function/rule data preparation unit 13. The units 11 and 12 maybe represented by portions of the input device, the display unit and the computer, respectively.

A rule, what is called as a 1F-THEN rule, is entered into the rule setting unit 11 to be displayed. An example of such a 1F-THEN rule is expressed as the following:

Rule 1: If X1=MF13, X2=MF25, X3=MF31, then y1=mf12
Rule 2: If X1=MF12, X2=MF22, X3=MF32, then y1=mf15
Rule j: If XS=MF53, X6=MF61, then y2=mf21

An item starting with "If" is defined as an antecedent, and an item starting with "then" is defined as a consequent. The antecedent includes a plurality of propositions each consisting of a pair of a variable and a membership function. X1, X2, X3, X5 and X6 are input variables, y1 and y2 are output variables, MF12, MF13, MF22, MF25, MF31, MF32, MF53, MF61, mf12, mf15, and mf21 are membership functions.

A plurality of kinds of membership functions in this embodiment are made for input and output variables. Identification codes expressing kinds of membership functions (MF, mf and their subsequent suffix) are defined as labels. As the above-mentioned rules are entered into the rule setting unit 11, the entered rules are applied to the membership function/rule data preparation unit 13 to be coded.

An operation for setting seven kinds of membership functions MF11 through MF17 about input variable X1 will be explained hereinafter.

For a simplified explanation, a triangle shape of membership function is introduced. The triangle shape may be represented by a coordinate of its vertex and gradients of both oblique sides of it or by coordinates of its vertex and both ends of the base. If a grade of a vertex (a value of a membership function) is always defined as "1", a coordinate of a vertex may be represented by a variable X. A range where a grade of a membership function having a triangle shape is not zero (a length range of the base, is called as a range of definition of a membership function. A membership function of this embodiment is represented by a coordinate of a vertex and gradients of both slopes of it.

Figure 3:
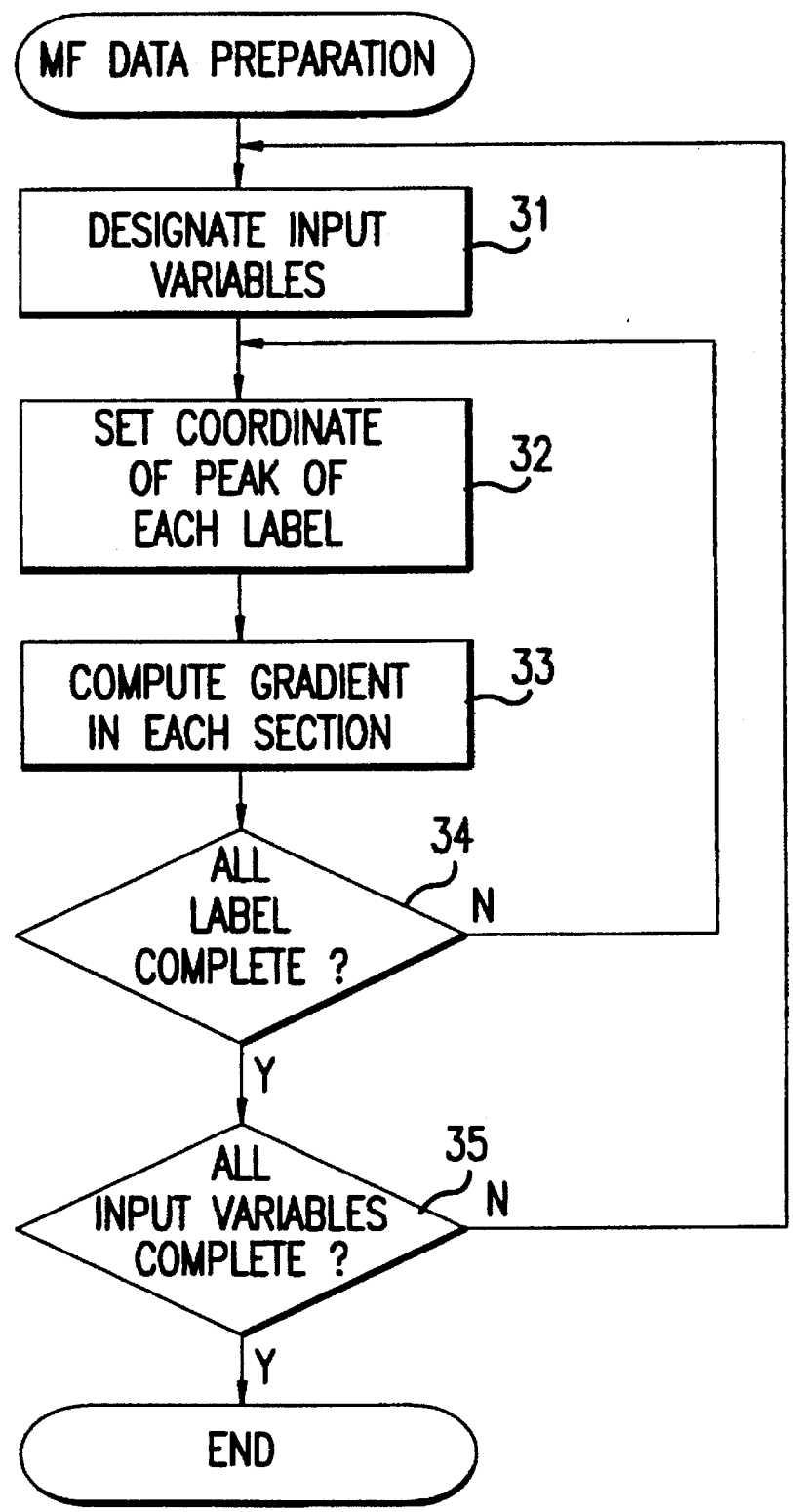
FIG. 3 is a flow chart showing a sequence of preparing membership function data.

FIG. 3 shows an operation in membership function setting unit 12 and membership function/rule data preparation unit 13.

In a step 31, an input variable is designated by being entered into the setting unit 12. An input variable X1 is assumed to be designated.

Figure 2:
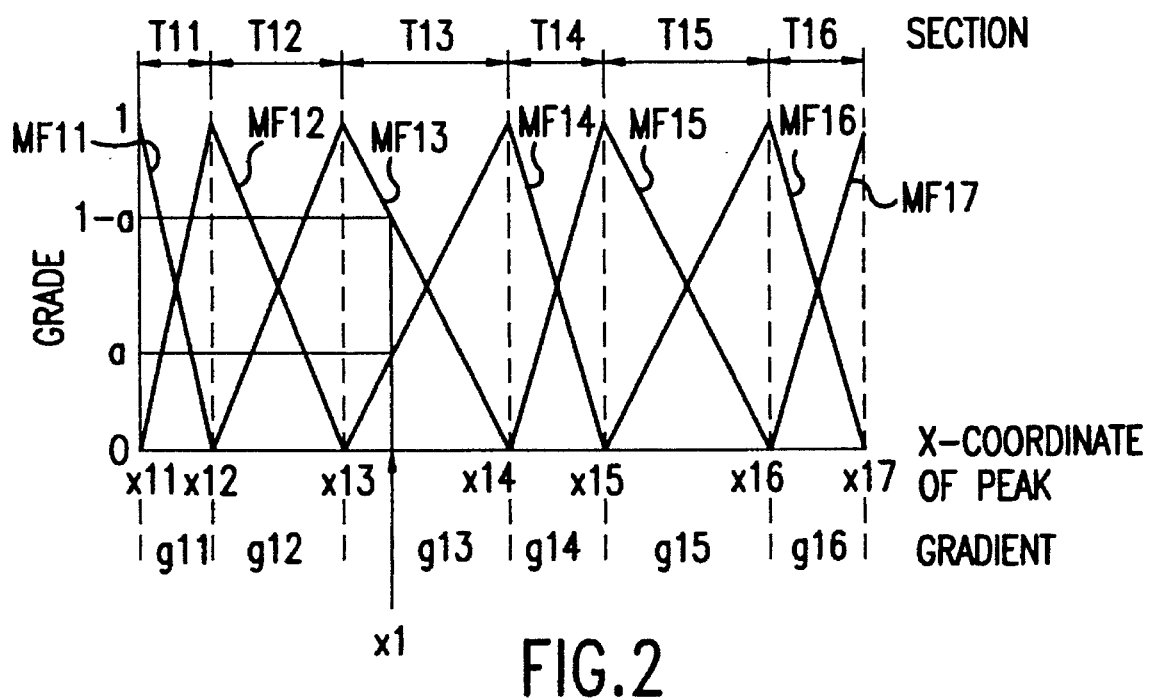
FIG. 2 is a graph showing membership functions.

Labels MF11 through MF17 of seven kinds of membership functions about input variable X1 and X coordinates X11 through X17 about vertexes of the functions as shown in FIG. 2 are entered by unit 12 (step 32) wherein every grades of the vertexes are "1". These entered data are applied to the unit 13.

The range of definition of each membership function if defined as a range between X coordinates of vertexes of 5 membership functions which are adjacent on left-and-right hand sides. Regarding 9 membership function at a left or right end, a range between a x coordinate of a vertex of a membership function adjacent to it in a right or left side direction and a left or right end of the range of variable X is defined as a range of definition.

The range of variable X is divided into six sections T11 through T16 by coordinates X12 through X16 of vertexes. Membership functions adjacent on left and right sides are duplicately defined in each section, and symmetrical with respect to a center of the section. Accordingly, only one gradient g11 to g16 is defined in each section. Positive gradients are defined in this embodiment. A gradient of a left oblique side of a right hand side membership function in each section is one of gradients g11 through g16, and a gradient of right oblique side of a left hand side membership function is one of gradients −g11 through −g16.

Gradients g11 through g16 in the respective sections T11 through T16 are computed by employing vertex coordinate data X11 through X17 respectively (steps 33 and 34). A gradient g1i is obtained by g1i=1/[x1(i+1)−x1i]. The numerator "1" expresses a grade. If 8 bits are introduced, the numerator "1" of the above-mentioned equation is replaced by "256".

Thus, all data of the seven kinds of membership functions about variable X1 as shown in FIG. 4 are prepared. It will be understood from table of FIG. 4 that a data volume of FIG. 4 is much smaller than a data volume in a case for setting coordinates of the respective vertexes, a pair of gradients of both oblique sides, and, if desired, coordinates of both ends of the base.

The above-mentioned operation will be executed on repeat about every input variables (step 35). If desired, data w11 through w17 representing weight of the respective membership functions may be set as shown in FIG. 4.

Returning to FIG. 5, there is shown a fuzzy inference device 20 including a controller unit 21, an input/output unit 22, a rule/membership function memory 23, a buffer memory 24 and a four arithmetic operation unit 25. The device 20 may be represented by a computer system (particularly a microprocessor) including memories. The memory 23 stores data representing the rules and membership functions which are prepared by the knowledge setting device 10 of FIG. 1. The data about membership functions are stored in the manner shown in FIG. 4. The buffer member 24 temporally stores various kinds of data, such as later-described degrees of adaptation or the like, made in an execution process of a fuzzy inference operation. The four arithmetic operation unit 25 is disposed to execute various kinds of arithmetic operations (ex. addition, subtraction, multiplication, M/N operation and M/N operation). The input/output unit 22 receives input data, and generates output data computed by a fuzzy inference operation. The controller unit 21 receives input data from the unit 22, and makes the unit 25 execute a predetermined operation in accordance with rules and membership functions stored in the unit 23. The controller unit 21 further makes the unit 22 generate the operation results to control a series of fuzzy inference operations.

Figure 6:
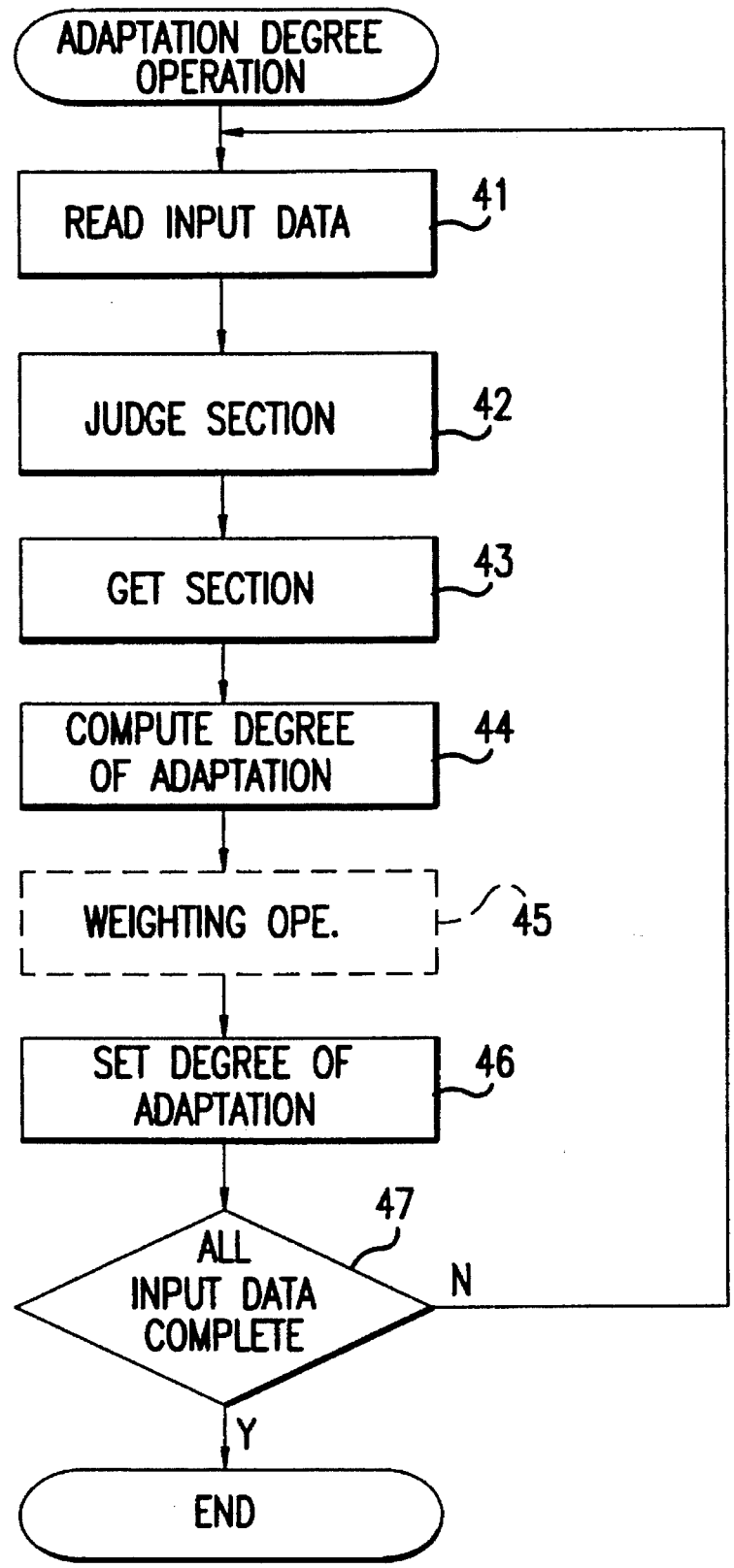
FIG. 6 is a flow chart showing a sequence of operating a degrees of adaptation.

FIG. 6 shown an example of an adaptation degree operation executed in the unit 25 under control by the controller unit 21.

Upon receiving input data (step 41), it is judged which section is belonged by the input data step 42). For instance, if input data X1 ( input data is represented by "X1") is applied in FIG. 2, it is determined that the input data X1 belongs to the section T13 because it is smaller than X14 and X13. Thus judged sections are stored in buffer memory 24 regarding the input variable X1 as shown in FIG. 7 (step 43).

Subsequently, an adaptation degree "a" about a right side membership function MF14 is obtained by employing a gradient data g13 set in the judged section T13. The adaptation degree a is produced by an equation a=x13+(x1−x13)*g13. The adaptation degree about a right side membership function MF13 is produced as "1-a" (FIG. 2). In an eight bit mode, it is expressed by "256-a" (step 44).

Thus, the adaptation degrees of input data X1 about the computed membership functions MF14 and MF13 are set into the buffer memory 24 (step 46, FIG. 7). If desired, these adaptation degrees are multiplied by weight data w14, w14, the product is set to buffer memory 24. The above-mentioned operation will be executed about every input data (step 47).

Figure 8:
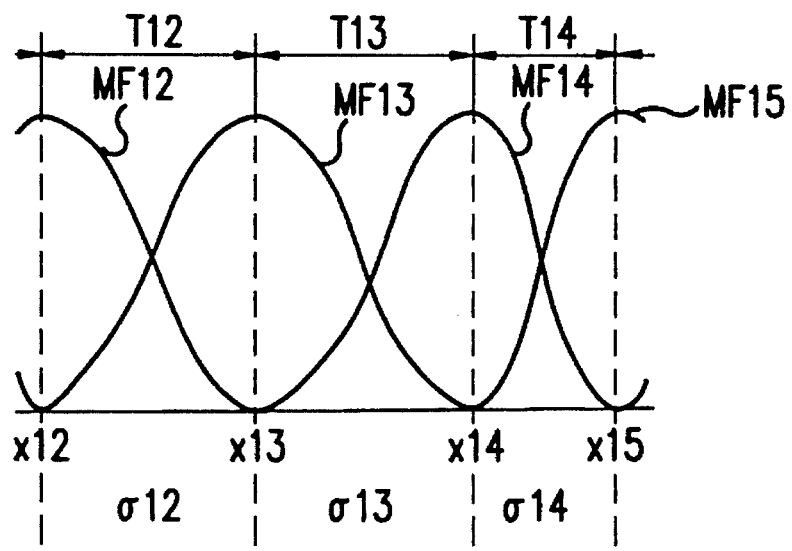
FIG. 8 is a graph showing another type of membership functions.

It is a conventional way that an adaptation degree in accordance with a set rule is selectively read out of the buffer memory 24 after the above-mentioned computation of adaptation degrees and adaptation degrees of antecedents of the respective rules are computed by their M/N operations. By employing the adaptation degrees of antecedents, arithmetic operations and determination operations about consequents are executed to generate output data. Though membership functions are set as a triangle shape in this embodiment, they may be modified to be expressed by Gaussian distribution (normal distribution) functions as shown in FIG. 8. In this modification, a parameter for providing a shape preferably employs a standard deviation σ. Values of the standard deviation may be different on left and right sides of a vertex of the function (ex. σ13 and σ14 of membership function MF14). The grade of the function is set to become zero at a position 3σ or 4σ from the center of the function.

Figure 9:
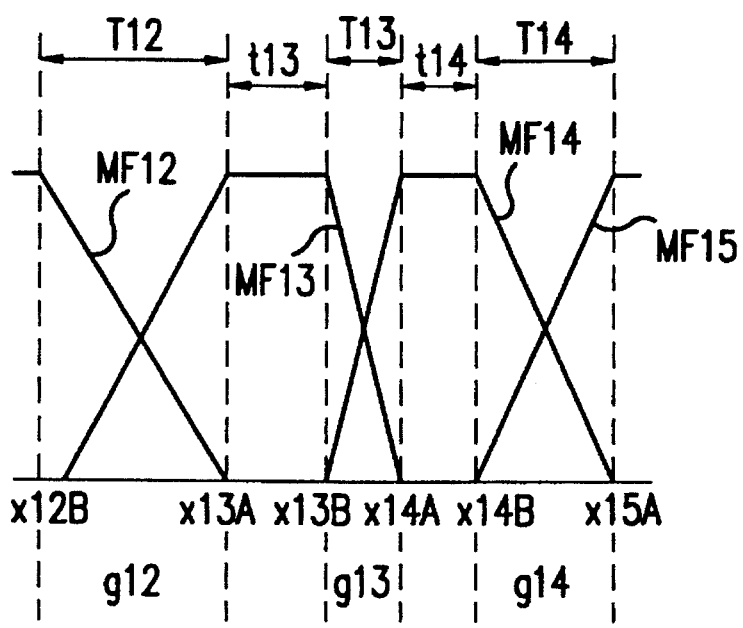
FIG. 9 is a graph showing another type of membership functions.

As a further modification, a trapezoid shape of membership functions may be employed as shown in FIG. 9. A pair of peaks maybe defined at both ends of upper side of the trapezoid (e.g., X13A and X13B of membership function MF13). Since grade is always "1" in a section of an upper side (t13, t14), an adaptation degree is set to "1" when input data is judged to belong to these sections.

It should be understood that the above description is merely illustrative of this invention and that many changes and modifications may be made by those skilled in the art without departing from the scope of the appended claims.

What is claimed is:

1. An adaptation degree operation device in which a plurality of membership functions are set within defined sections of an input data range, said sections having boundaries located at peaks of said membership functions, said plurality of membership functions being set by stored data in a memory representing said peaks and, for each section, by stored data in said memory defining the gradient of a pair adjacent and overlapping portions of membership functions associated with said section, said pair of overlapping portions of said membership functions within a section being symmetrical with respect to a center of the section, said device comprising:

a judging unit for determining a section to which applied input data belongs;

an operation unit for finding in said determined section a first degree of adaptation of said applied input data with respect to a first membership function of the section using peak and gradient data stored in said memory for said determined section and associated with said first membership function, and finding a second degree of adaptation of a second membership function of the determined section based on the found first degree of adaptation; and a weighting operation unit for applying weighting data for said corresponding first and second membership function to said found first and second degrees of adaptation.

2. A machine implemented method for determining a degree of adaptation of an input variable to membership functions comprising the steps of:

setting a plurality of membership functions in an input data range, said set membership functions defining sections having boundaries defined by the peaks of said membership functions, portions of adjacent ones of said membership function residing within said sections and having shapes which are symmetrical with respect to a center line of a section, said membership functions being set by storing data defining the peaks thereof in a memory, and storing data representing the gradient of a portion of one of the membership functions residing within each section in said memory;

determining a section to which applied input data belongs; and finding in the determined section a first degree of adaptation of said applied input data with respect to a portion of a first membership function within the determined section using stored data in said memory representing the peak of said first membership function and stored data in said memory defining gradient of said portion of said first membership function for said determined section, and finding a second degree of adaptation of said applied input data with respect to a portion of a second membership function within the determined section based on the found first degree of adaptation.

3. A machine implemented method for determining a degree of adaptation of an input variable to stored membership functions, said stored membership functions residing within an input data range divided into sections by the peaks of said membership functions, portions of adjacent ones of said membership functions residing in overlapping fashion within a section, the shapes of the portions of said adjacent membership functions within a section being symmetrical with respect to a center line of a section, said membership functions being stored in a memory in the form of data defining the peaks of the membership functions and data representing the gradient of a portion of one of the overlapping membership functions residing in each section, said method comprising the steps of:

determining a section to which applied input data belongs; and finding in the determined section a first degree of adaptation of said applied input data with respect to a first membership function partially within the determined section using stored data in said memory of the peak of said first membership function and stored data in said memory representing the gradient for said determined section, and finding a second degree of adaptation of said applied input data with respect to a second membership function partially within the determined section based on the found first degree of adaptation.

4. A method for operating a degree of adaptation according to claim 3, wherein said second degree of adaptation is obtained by subtracting said first degree of adaptation from "1".

5. A method for operating a degree of adaptation where weight data is applied to each membership function according to claim 20, wherein a weighting operation is executed by applying weighting data of corresponding membership functions to said first and second degrees of adaptation.

6. An adaptation degree operation device comprising:

a memory in which a plurality of membership functions are set to define sections of an input data range, said sections having boundaries at peaks of said overlapping membership functions, shapes of a pair of membership functions associated with a said section being symmetrical with respect to a center of the section, said memory storing data representing the peaks of said membership functions and data representing a gradient of the membership functions for each of said sections;

a judging unit for determining a section to which applied input data belongs;

an operation unit for finding in said determined section a first degree of adaptation of said applied input data with respect to a first membership function of the section using peak and gradient data stored in said memory for said determined section and associated with said first membership function, and finding a second degree of adaptation of a second membership function of the determined section based on the found first degree of adaptation.

7. A device according to claim 6, wherein said operating unit finds said second degree of adaptation by subtracting said first degree of adaptation from "1".

* * * * *